United States Patent
Zhou et al.

(10) Patent No.: US 11,398,684 B2
(45) Date of Patent: Jul. 26, 2022

(54) ANTENNA ROUTING METHOD AND RELATED DEVICES

(71) Applicant: GUANGDONG OPPO MOBILE TELECOMMUNICATIONS CORP., LTD., Guangdong (CN)

(72) Inventors: Lei Zhou, Guangdong (CN); Zhi Chen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 19 days.

(21) Appl. No.: 17/104,838

(22) Filed: Nov. 25, 2020

(65) Prior Publication Data

US 2021/0226347 A1 Jul. 22, 2021

(30) Foreign Application Priority Data

Jan. 21, 2020 (CN) .......................... 202010072638.1

(51) Int. Cl.
*H01Q 21/24* (2006.01)
*H01Q 3/24* (2006.01)
*H01Q 3/26* (2006.01)
*H01Q 21/28* (2006.01)

(52) U.S. Cl.
CPC ............. *H01Q 21/245* (2013.01); *H01Q 3/24* (2013.01); *H01Q 3/2617* (2013.01); *H01Q 21/28* (2013.01)

(58) Field of Classification Search
CPC ........ H01Q 21/28; H01Q 3/2617; H01Q 3/24; H01Q 21/245
See application file for complete search history.

(56) References Cited

U.S. PATENT DOCUMENTS

| 2008/0122706 A1 | 5/2008 | Jalali |
| 2014/0269964 A1 | 9/2014 | Du et al. |
| 2016/0149634 A1 | 5/2016 | Kalkunte et al. |

(Continued)

FOREIGN PATENT DOCUMENTS

| CN | 102810126 | 12/2012 |
| CN | 103368624 | 10/2013 |
| CN | 105049560 | 11/2015 |

(Continued)

OTHER PUBLICATIONS

WIPO, International Search Report and Written Opinion of PCT/CN2020/132930, dated Feb. 25, 2021.

(Continued)

*Primary Examiner* — Graham P Smith
(74) *Attorney, Agent, or Firm* — Hodgson Russ LLP

(57) ABSTRACT

An antenna routing method and related devices are provided. A user terminal equipment includes multiple antenna groups distributed around a periphery of the user terminal equipment. Each antenna group includes two antennas. Two antennas in each antenna group are different in polarization direction. The method includes the following. Two antennas in any one antenna group of the multiple antenna groups are enabled and one antenna in each of two antenna groups adjacent to the any one antenna group is enabled respectively, and a first signal quality of the antennas enabled is measured, to obtain multiple first signal qualities. A set of antennas with the optimal first signal quality is determined according to the multiple first signal qualities, to receive or transmit radio frequency signals.

20 Claims, 10 Drawing Sheets

(56) References Cited

U.S. PATENT DOCUMENTS

| | | |
|---|---|---|
| 2019/0014586 A1 | 1/2019 | Zhu et al. |
| 2019/0074883 A1 | 3/2019 | Park et al. |

FOREIGN PATENT DOCUMENTS

| | | |
|---|---|---|
| CN | 105896071 | 8/2016 |
| CN | 107580124 | 1/2018 |
| CN | 107863605 | 3/2018 |
| CN | 108092702 | 5/2018 |
| CN | 108769377 | 11/2018 |
| CN | 108923792 | 11/2018 |
| CN | 108988877 | 12/2018 |
| CN | 109525291 | 3/2019 |
| CN | 109904626 | 6/2019 |
| CN | 110649369 | 1/2020 |
| CN | 111245482 | 6/2020 |
| EP | 2925042 | 9/2015 |
| WO | 2015046380 | 4/2015 |
| WO | 2018111690 | 6/2018 |
| WO | 2018219328 | 12/2018 |
| WO | 2019158207 | 8/2019 |

OTHER PUBLICATIONS

EPO, Extended European Search Report for EP Application No. 20211469.0, dated May 7, 2021.

"3rd Generation Partnership Project; Technical Specification Group Radio Access Network; NR; User Equipment (UE) radio transmission and reception; Part 3: Range 1 and Range 2 Interworking operation with other radios (Release 15)," 3GPP TS 38.101-3, Sep. 2019, V15.7.0.

CNIPA, First Office Action for CN Application No. 202010072640.9, dated Oct. 10, 2020.

WIPO, International Search Report and Written Opinion for PCT/CN2020/132931, dated Feb. 26, 2021.

EPO, Extended European Search Report for EP Application No. 20211630.7, dated May 7, 2021.

CNIPA, Second Office Action for CN Application No. 202010072640.9, dated Jun. 9, 2021.

CNIPA, Notification to Grant Patent Right for Invention for CN Application No. 202010072640.9, dated Oct. 11, 2021.

```
┌─────────────────────────────────┐
│   THE USER TERMINAL EQUIPMENT   │
│   ENABLES TWO ANTENNAS IN ANY ONE │
│   ANTENNA GROUP OF THE MULTIPLE │
│   ANTENNA GROUPS AND ENABLES ONE │─── S401
│   ANTENNA IN EACH OF TWO ANTENNA │
│   GROUPS ADJACENT TO THE ANY ONE │
│   ANTENNA GROUP RESPECTIVELY, AND│
│   MEASURES A FIRST SIGNAL QUALITY OF│
│   THE ANTENNAS ENABLED, TO OBTAIN│
│   MULTIPLE FIRST SIGNAL QUALITIES│
└─────────────────────────────────┘
                 │
┌─────────────────────────────────┐
│   THE USER TERMINAL EQUIPMENT   │
│   DETERMINES A SET OF ANTENNAS WITH│
│   THE OPTIMAL FIRST SIGNAL QUALITY│─── S402
│   ACCORDING TO THE MULTIPLE FIRST│
│   SIGNAL QUALITIES, TO RECEIVE OR│
│   TRANSMIT RADIO FREQUENCY SIGNALS│
└─────────────────────────────────┘
```

FIG. 4

ANTENNA ROUTING METHOD AND RELATED DEVICES

CROSS-REFERENCE TO RELATED APPLICATION(S)

This application claims priority to Chinese Patent Application No. 202010072638.1, filed on Jan. 21, 2020, the entire disclosure of which is incorporated by reference herein.

TECHNICAL FIELD

This disclosure relates to the technical field of communications, and particular to an antenna routing method and related devices.

BACKGROUND

With the progress of science and technology, mobile terminals such as mobile phones, tablet computers, and the like are provided with antennas so as to receive and transmit electromagnetic wave signals and realize wireless communication. Multiple-input multiple-output (MIMO) is a multi-antenna wireless communication system. Compared with a common single-input single-output (SISO) system, MIMO can utilize multiple antennas at a transmitting end to independently transmit signals, and utilize multiple antennas at a receiving end to receive and recover original information. MIMO has attracted much attention in recent years because it can significantly increase data throughput and transmission distance of a communication system without increasing bandwidth or total transmission power consumption. In an antenna system of multiple operation modes compatible with SISO and MIMO, low frequency correlation among antennas is high, and thus performance of the MIMO system is affected.

SUMMARY

In a first aspect, implementations provide an antenna routing method. The method is applicable to a user terminal equipment. The user terminal equipment includes multiple antenna groups distributed around a periphery of the user terminal equipment. Each antenna group includes two antennas. Two antennas in each antenna group are different in polarization direction. The method includes the following.

Two antennas in any one antenna group of the multiple antenna groups are enabled and one antenna in each of two antenna groups adjacent to the any one antenna group is enabled respectively, and a first signal quality of the antennas enabled is measured, to obtain multiple first signal qualities. A set of antennas with the optimal first signal quality is determined according to the multiple first signal qualities, to receive or transmit radio frequency signals.

In a second aspect, implementations provide a user terminal equipment. The user terminal equipment includes a radio frequency front end module, multiple antenna groups, at least one processor, and a non-transitory computer readable storage.

The radio frequency front end module is configured to control antennas to receive and transmit radio frequency signals. The multiple antenna groups are distributed around a periphery of the user terminal equipment, where each antenna group includes two antennas. The non-transitory computer readable storage is coupled to the at least one processor and stores at least one computer executable instruction thereon which, when executed by the at least one processor, causes the at least one processor to: enable two antennas in any one antenna group of the multiple antenna groups and enable one antenna in each of two antenna groups adjacent to the any one antenna group respectively, measure a signal quality of the antennas enabled, repeat the above for at least two of the multiple antenna groups to obtain multiple signal qualities, and determine a set of antennas with the optimal signal quality according to the multiple signal qualities to receive or transmit radio frequency signals, when the antennas receive and transmit radio frequency signals.

In a third aspect, implementations provide an electronic device. The electronic device includes at least one processor, a communication interface, and a non-transitory computer readable storage coupled to the at least one processor and storing at least one computer executable instruction thereon. The at least one computer executable instruction, when executed by the at least one processor, causes the at least one processor to: enable two antennas in any one antenna group of multiple antenna groups of the electronic device and enable one antenna in each of two antenna groups adjacent to the any one antenna group respectively, and measure a first signal quality of the antennas enabled, to obtain multiple first signal qualities, where the multiple antenna groups are distributed around a periphery of the electronic device, each antenna group includes two antennas, and two antennas in each antenna group are different in polarization direction; and determine, according to the multiple first signal qualities, a set of antennas with the optimal first signal quality, to receive or transmit radio frequency signals.

BRIEF DESCRIPTION OF THE DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

FIG. 4 is a flowchart illustrating an antenna routing method according to implementations.

DETAILED DESCRIPTION

To render those skilled in the art to understand technical solutions of this application, the technical solutions in implementations of the present disclosure will be described clearly and completely hereinafter with reference to the accompanying drawings. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second" used in the specification, the claims, and the accompany drawings of the present disclosure are used to distinguish different objects rather than describe a particular order. In addition, the terms "include", "comprise", and "have" as well as variations thereof are intended to cover non-exclusive inclusion. For example, a process, method, system, product, or apparatus including a series of operations or units is not limited to the listed operations or units, it can optionally include other operations or units that are not listed; alternatively, other operations or units inherent to the process, method, product, or device can be included either.

The term "implementation" referred to herein means that a particular feature, structure, or feature described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

Figure 1:
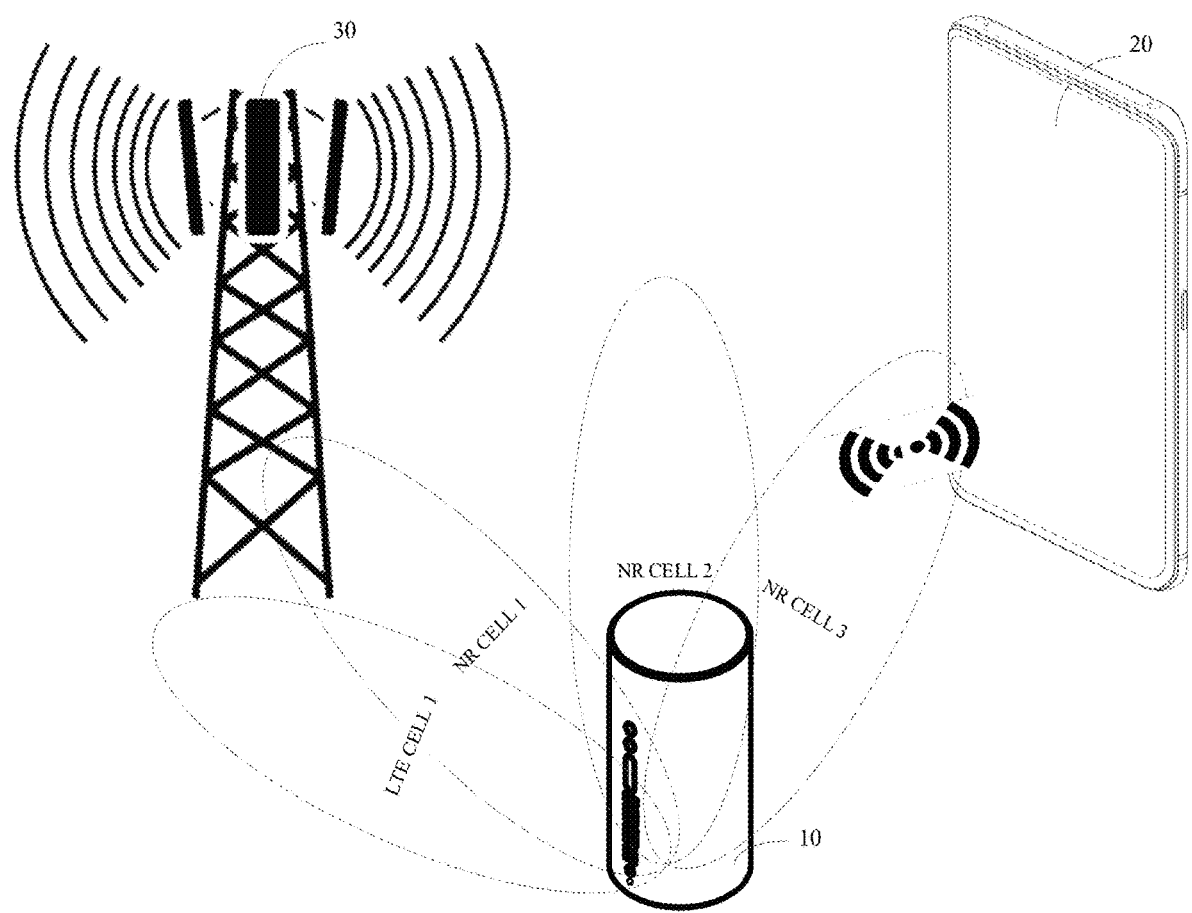
FIG. 1 is a schematic diagram illustrating an application system architecture of a user terminal equipment according to implementations.

FIG. 1 is a schematic diagram illustrating an application system architecture of a user terminal equipment according to implementations. As illustrated in FIG. 1, the user terminal equipment 10 is a customer premises equipment (CPE). The user terminal equipment 10 is configured to communicate with a base station 30, receive a first network signal sent by the base station 30, and convert the first network signal into a second network signal. The second network signal can be used by terminal devices 20 such as a tablet computer, a smart phone, a notebook computer, and the like. The first network signal may be, but is not limited to, a fifth generation (5G) mobile communication technology signal. The second network signal may be, but is not limited to, a wireless-fidelity (Wi-Fi) signal. The CPE can be widely applied to rural areas, towns, hospitals, factories, districts, and the like. The first network signals which can be accessed by the CPE can be wireless network signals, so that cost of laying a wired network can be saved.

Figure 2:
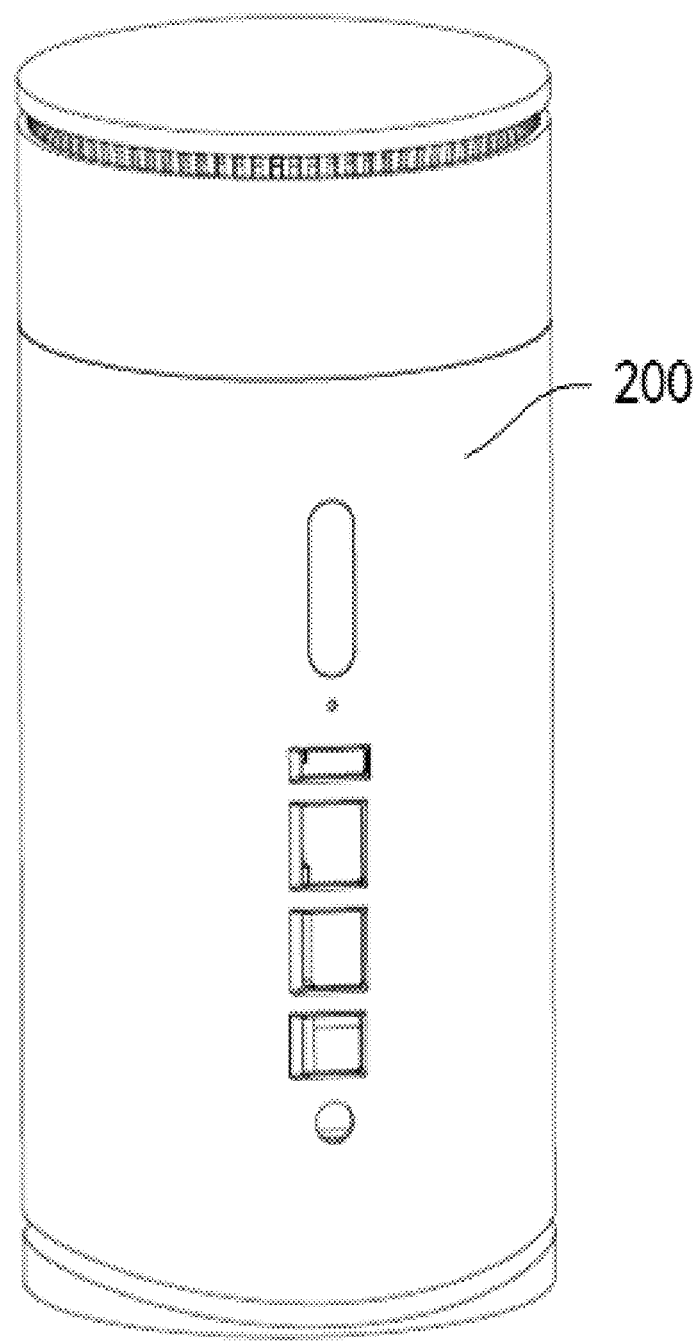
FIG. 2 is a schematic structural diagram illustrating a user terminal equipment according to implementations.

FIG. 2 is a schematic structural diagram illustrating a user terminal equipment according to implementations. As illustrated in FIG. 2, the user terminal equipment includes a housing 200. The housing 200 may be in a shape of a multi-surface cylindrical cylinder, a cylindrical cylinder, or other shapes, which are not limited herein. The housing 200 may be made of, but is not limited to, an insulating material such as plastic. The user terminal equipment is a set of system combining software and hardware. As illustrated in FIG. 2, the user terminal equipment further includes multiple interfaces, where the multiple interfaces include an external interface and the external interface is used for electrically connecting with an external antenna group. The user terminal equipment further includes internal antennas and external antennas, where the internal antennas and the external antennas are used for transmitting and/or receiving radio frequency signals. The user terminal equipment may include but is not limited to a CPE. The CPE is a client of a novel optical fiber user access network service, and is used for providing services such as wired broadband, etc. The CPE is a mobile signal access device for receiving mobile signals and forwarding the mobile signals out via wireless Wi-Fi signals, and is also an equipment for converting network signals sent by a base station into Wi-Fi signals. The user terminal equipment selects four antennas from the internal antennas and the external antennas, to transmit and/or receive radio frequency signals, for example, receiving a first signal sent by the base station, converting the first signal into a second signal, and sending the second signal to terminal devices such as a smart phone and a tablet computer.

Figure 3:
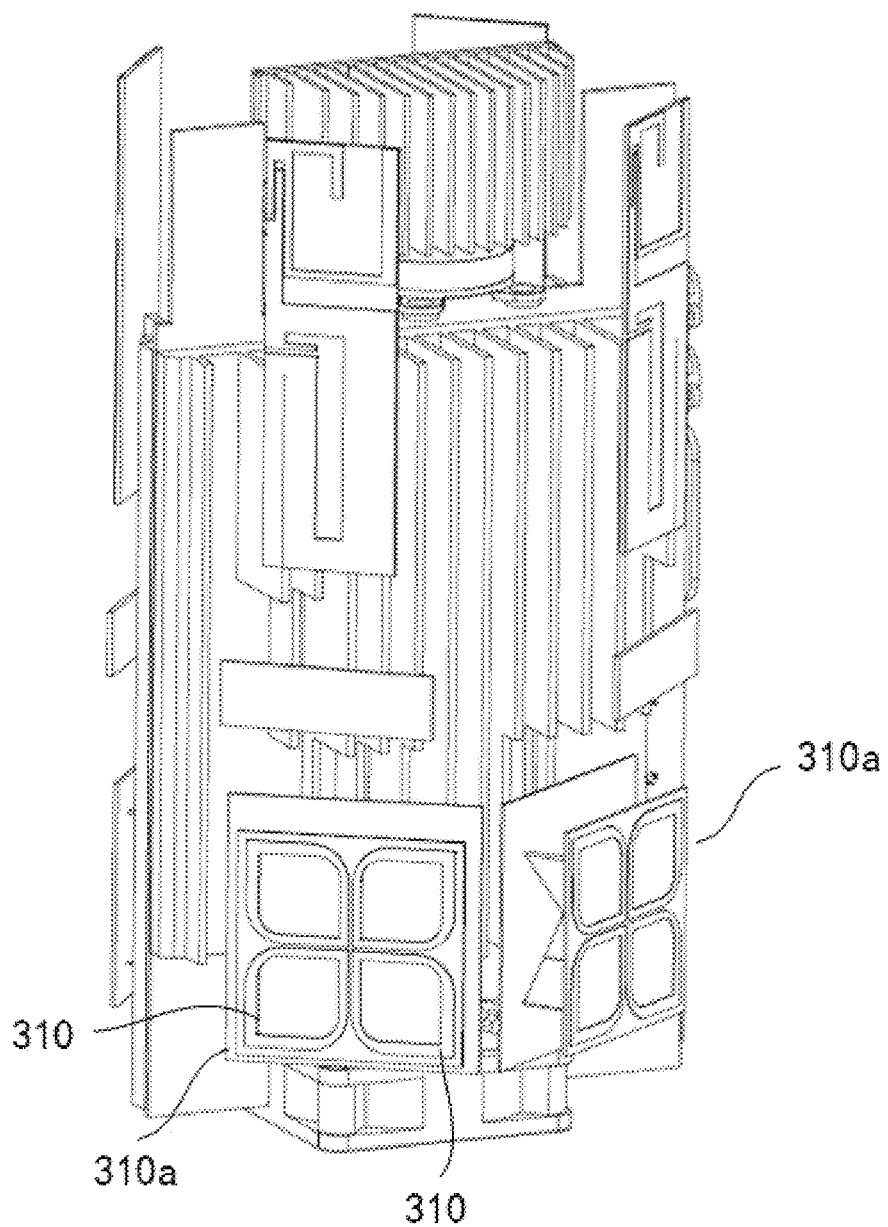
FIG. 3 is a schematic structural diagram illustrating the user terminal equipment of FIG. 2 with a housing removed according to implementations.

FIG. 3 is a schematic structural diagram illustrating the user terminal equipment of FIG. 2 with a housing removed according to implementations. The user terminal equipment includes multiple antenna groups 310a and a signal conversion device. The multiple antenna groups 310a are distributed around a periphery of the user terminal equipment. Each antenna group 310a includes two antennas 310. The two antennas 310 in each antenna group 310a are the same in orientation and are different in polarization direction. The multiple antennas 310 are configured to receive a first network signal. The signal conversion device is configured to select four antennas 310 from the multiple antennas 310 to receive the first network signal and configured to convert the first network signal received by the selected four antennas 310 into a second network signal.

The multiple antenna groups may be, but is not limited to, four antenna groups.

The antenna 310 may be, but is not limited to, a receiving antenna for millimeter wave signal or terahertz signal. Accordingly, the first network signal may be, but is not limited to, a millimeter wave signal or a terahertz signal. Currently, in the 5G wireless systems, according to the specification of the 3GPP TS 38.101, two frequency ranges are mainly used in 5G new radio (NR): frequency range (FR)1 and FR2. The frequency range corresponding to FR1 is 450 MHz~6 GHz, also known as the sub-6 GHz; the frequency range corresponding to FR2 is 24.25 GHz~52.6 GHz, usually called millimeter wave (mm Wave). 3GPP (release 15) specifies the present 5G millimeter wave as follows: n257 (26.5~29.5 GHz), n258 (24.25~27.5 GHz), n261 (27.5~28.35 GHz), and n260 (37~40 GHz). Millimeter wave signal or terahertz signal has advantages such as fast transmission speed. However, millimeter wave signal or terahertz signal is easily sheltered from by an external object. When there is an object between the antenna 310 and the base station 3, the first network signal received by the antenna 310 has weak signal strength. In this case, if the first network signal with weak signal strength is converted into the second network signal, a signal strength of the obtained second network signal may also be weak. In explanation of the implementations, the antenna 310 is a receiving antenna for sub-6 GHz signal. Accordingly, the first network signal is a radio frequency signal in a sub-6 GHz, and the second network signal may be, but is not limited to, a Wi-Fi signal.

The multiple antenna groups 310a may be disposed around the periphery of the user terminal equipment, which is not limited to the case where the multiple antenna groups 310a surround the inside of the housing 200 for one or more circles. The multiple antenna groups 310a may be directly or indirectly disposed on an inner wall of the housing 200 or disposed on other components, as long as the multiple antenna groups 310a surround the periphery of the user terminal equipment.

Due to uncertainty of the position of the base station 3 transmitting the first network signal, the transmission direction of the first network signal is uncertain. The signal strength of the first network signal received by the antenna 310 in each direction is also different. For example, when an object obscures between the antenna 310 and the base station 3, the first network signal received by the antenna 310 has weak signal strength. In this case, if the first network signal with weak signal strength is converted into the second network signal, a signal strength of the obtained second network signal may also be weak. According to this application, the multiple antennas 310 are distributed around the periphery of the user terminal equipment, such that the multiple antennas 310 can detect first network signals in multiple directions. In this way, accuracy of determining a first network signal with the strongest signal strength according to signal strengths of the collected first network signals can be improved, thereby providing a necessary basis for obtaining a second network signal(s) with stronger signal strength. The signal conversion device selects one or more first network signals with the strongest signal strength received by the antennas 310 and converts the one or more first network signals into one or more second network signals, thereby improving signal strengths of the converted second network signals.

In addition, the first network signal transmitted by the base station 3 exhibits elliptical polarization due to scattering and other reasons during propagation to the user terminal equipment. Usually, the antenna 310 in a certain polarization direction is unable to receive all energy of the first network signal, or even the energy of the first network signal received by the antenna 310 in a certain polarization direction is very low. In this application, two antennas 310 in one antenna group 310a are different in polarization direction, which can improve a probability that the first network signal received by the two antennas 310 in the antenna group 310a has higher energy.

In at least one example, one antenna group 310a includes two antennas 310. One antenna 310 of the two antennas 310 in the same antenna group 310a has a first polarization direction, and the other antenna 310 of the two antennas 310 in the same antenna group 310a has a second polarization direction, where the first polarization direction and the second polarization direction are ±45° polarization directions, respectively.

As described above, the first network signal transmitted by the base station 3 exhibits elliptical polarization due to scattering and other reasons during propagation to the user terminal equipment. A single antenna 310 in a horizontal polarization direction or a vertical polarization direction is unable to receive all of the energy. In order to receive as much energy of the first network signal as possible, two antennas 310 in mutually perpendicular polarization directions are disposed in one antenna group 310a to receive the first network signal. As such, the energy of the first network signal can be received at any time in the antenna group 310a. However, during transmission of the first network signal with vertical polarization or horizontal polarization, the first network signal becomes a first network signal with elliptical polarization, and the first network signal with elliptical polarization has inconsistent components in the vertical direction and the horizontal direction. If two antennas 310 in 0° and 90° linear polarization directions are respectively used in the antenna group 310a, most of the first network signal is received by one antenna 310. Therefore, to ensure that two antennas 310 in the same antenna group 310a can be effectively used, the two antennas 310 in the same antenna group 310a are respectively set to have ±45° polarization directions, so that each antenna 310 in the same antenna group 310a can effectively receive the first network signal.

At present, to support the conventional 2/3/4G network and 5G NR network by electronic devices such as mobile phones and other mobile terminal products, a four-antenna scheme is adopted in the design of the related wireless terminal products for the 5G NR band. However, when used indoors, there are problems such as serious energy consumption and heating, and large attenuation in received signal and reduced data transmission rate (throughput) with the base station.

In view of the above problems, this application provides an antenna routing method. The following describes implementations of this application in detail with reference to the accompanying drawings.

FIG. 4 is a flowchart illustrating an antenna routing method according to implementations. The method is applicable to a user terminal equipment. The user terminal equipment includes multiple antenna groups distributed around a periphery of the user terminal equipment. Each antenna group includes two antennas. Two antennas in each antenna group are different in polarization direction. As illustrated in FIG. 4, the method begins at S401.

At S401, the user terminal equipment enables two antennas in any one antenna group of the multiple antenna groups and enables one antenna in each of two antenna groups adjacent to the any one antenna group respectively, and measures a first signal quality of the antennas enabled, to obtain multiple first signal qualities.

Figure 5:
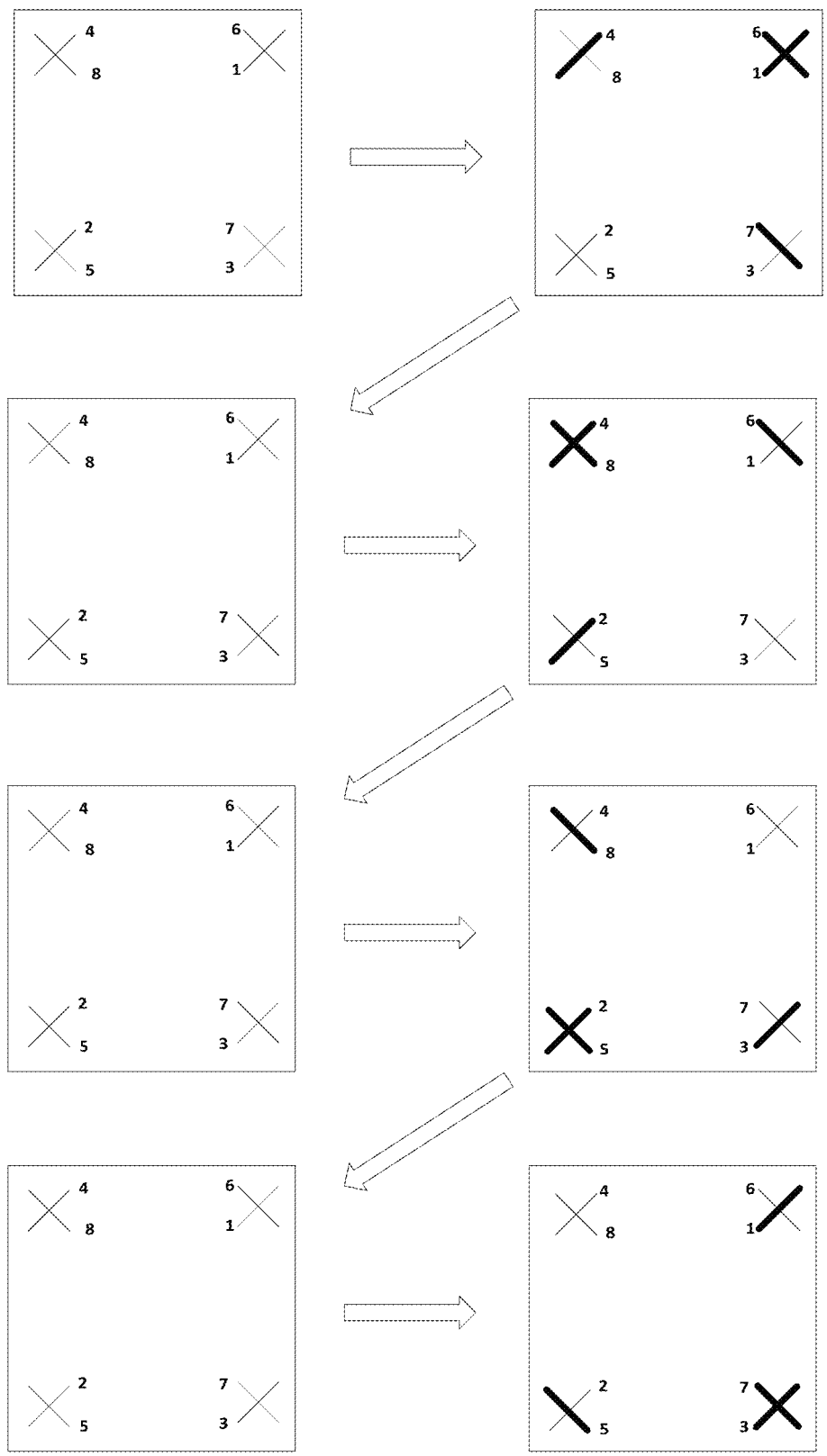
FIG. 5 is a schematic diagram illustrating a set of antennas according to implementations.

FIG. 5 is a schematic diagram illustrating a set of antennas according to implementations. As illustrated in FIG. 5, when the user terminal equipment detects startup or network access, the optimal set of antennas selected from the multiple antenna groups is used to access a network of a base station. The network is a conventional 2/3/4G network and a 5G NR network, where the 5G NR network includes an NSA (non-standalone)/SA (standalone) network. The user terminal equipment enables the two antennas in the any one antenna group of the multiple antenna groups and enables one antenna in each of two antenna groups adjacent to the any one antenna group respectively, and measures the first signal quality of the antennas enabled. In an example, enable antenna 1 and antenna 6, enable any one antenna in each of two antenna groups adjacent to antenna 1 and antenna 6, such as antenna 4 or antenna 8, and antenna 3 or antenna 7, and measure a first signal quality. Alternatively, enable antenna 4 and antenna 8, enable any one antenna in each of two antenna groups adjacent to antenna 4 and antenna 8, such as antenna 1 or antenna 6, and antenna 2 or antenna 5, and measure a first signal quality. Alternatively, enable antenna 2 and antenna 5, enable any one antenna in each of two antenna groups adjacent to antenna 2 and antenna 5, such as antenna 4 or antenna 8, and antenna 3 or antenna 7, and measure a first signal quality. Alternatively, enable antenna 3 and antenna 7, enable any one antenna in each of two antenna groups adjacent to antenna 3 and antenna 7, such as antenna 1 or antenna 6, and antenna 2 or antenna 5, and measure a first signal quality. It is to be noted that, the enabled antennas are denoted with bold line.

At S402, the user terminal equipment determines a set of antennas with the optimal first signal quality according to the multiple first signal qualities, to receive or transmit radio frequency signals.

The user terminal equipment compares the multiple first signal qualities measured, to determine the optimal first signal quality and a corresponding set of antennas, and receives or transmits radio frequency signals through the determined set of antennas.

According to the implementations, the user terminal equipment includes the multiple antenna groups distributed around the periphery of the user terminal equipment. Each antenna group includes two antennas. Two antennas in each antenna group are different in polarization direction. The method includes the following. The two antennas in the any one antenna group of the multiple antenna groups are enabled and one antenna in each of two antenna groups adjacent to the any one antenna group is enabled respectively, and the first signal quality of the antennas enabled is measured, to obtain the multiple first signal qualities. The set of antennas with the optimal first signal quality is determined according to the multiple first signal qualities, to receive or transmit radio frequency signals. As can be seen, by disposing the multiple antenna groups on the housing of the user terminal equipment and selecting the set of antennas with the optimal first signal quality for network access, it is possible to realize automatic direction adjustment according to an actual signal environment, and improve communication efficiency of antennas and a data transmission rate with the base station.

In at least one implementation, before the two antennas in the any one antenna group of the multiple antenna groups are enabled and one antenna in each of two antenna groups adjacent to the any one antenna group is enabled respectively and the first signal quality of the antennas enabled is measured, the following is further conducted. One antenna in each of the multiple antenna groups is enabled. Multiple second signal qualities are measured. An initial connection mode is started to receive or transmit radio frequency signals according to the multiple second signal qualities, where the initial connection mode is one antenna in each antenna group corresponding to the optimal second signal quality determined from the multiple second signal qualities.

Before the two antennas in the any one antenna group of the multiple antenna groups are enabled and one antenna in each of two antenna groups adjacent to the any one antenna group is enabled respectively, one antenna in each of the multiple antenna groups is enabled and a second signal quality is measured when one antenna in each of the multiple antenna groups is enabled each time. Thereafter, the multiple second signal qualities measured are compared to determine the optimal second signal quality and a corresponding set of antennas, and connect to the base station according to the determined set of antennas for signal reception and transmission.

Figure 6:
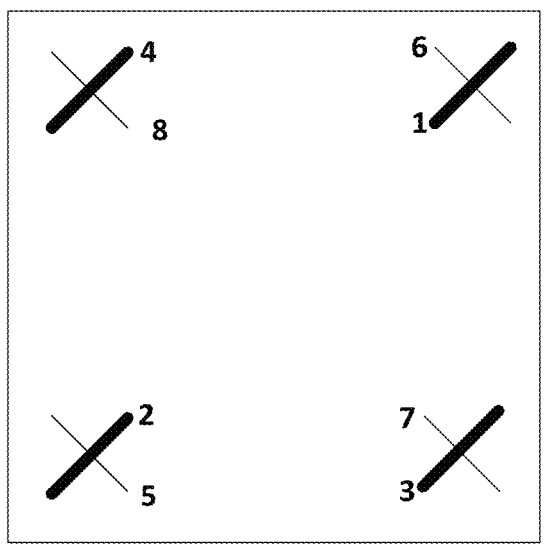
FIG. 6 is a schematic diagram illustrating selection of a set of antennas according to implementations.

FIG. 6 is a schematic diagram illustrating selection of a set of antennas according to implementations. FIG. 6 is a top view of the user terminal equipment. As illustrated in FIG. 6, when the user terminal equipment is started, or performs network access for the first time, the user terminal equipment attempts to access the network of the base station by using one antenna selected from each of four antenna groups. The network is a conventional 2/3/4G network and a 5G NR network, where the 5G NR network includes an NSA/SA network. One antenna in each of the multiple antenna groups can be enabled as illustrated in FIG. 6, for example, a set of antennas of antenna 1, antenna 2, antenna 3, and antenna 4, or other sets of antennas (e.g., a set of antennas of antenna 5, antenna 6, antenna 7, and antenna 8), but each antenna group should have one antenna enabled for access to the network of the base station.

In an example, after one antenna selected from each antenna group is successfully accessed to the network, the subsequent selection of antennas proceeds, otherwise, exit the NSA/SA network connection attempt.

According to the implementation, the user terminal equipment can determine a plane connection mode by respectively enabling any one antenna in each of the multiple antenna groups and measuring a corresponding signal quality, so as to avoid call drop of the user terminal equipment caused by poor signal quality during selection of antennas, and ensure the best signal quality and performance of the antennas in the plane connection mode.

In at least one implementation, the two antennas in the any one antenna group of the multiple antenna groups are enabled and one antenna in each of two antenna groups adjacent to the any one antenna group is enabled respectively as follows. Two antennas in any one antenna group of the multiple antenna groups are disabled, and a disabled antenna in an antenna group in the middle among remaining antenna groups that are not disabled is enabled.

In an example, one antenna in each of the multiple antenna groups can be enabled as illustrated in FIG. 6, for example, a set of antennas of antenna 1, antenna 2, antenna 3, and antenna 4. In this case, any one of antenna 1, antenna 2, antenna 3, and antenna 4 is disabled and a disabled antenna in an antenna group in the middle is enabled.

According to the implementation, the user terminal equipment can disable two antennas in any one antenna group of the multiple antenna groups and enable a disabled antenna in an antenna group in the middle among remaining antenna groups that are not disabled, and further obtain first signal qualities to determine a set of antennas. It is possible to avoid call drop of the user terminal equipment caused by poor signal quality during selection of sets of antennas, and ensure the best signal quality and performance of the set of antennas in the target angular-space.

In at least one implementation, two antennas in any one antenna group of the multiple antenna groups are disabled and the disabled antenna in the antenna group in the middle among the remaining antenna groups that are not disabled is enabled as follows. Two antennas in any one antenna group of the multiple antenna groups are disabled and a disabled antenna in a target antenna group is enabled, in turn in a preset direction. The initial connection mode is started, after the disabled antenna in the target antenna group is enabled and a current signal quality is measured.

The selection of antennas can be achieved as follows. For each of the multiple antenna groups, using one enabled antenna in the each of the multiple antenna groups as a reference, disable the enabled antenna in the each of the multiple antenna groups and enable a disabled antenna in a remaining antenna group which is located at diagonal of the each of the multiple antenna groups. As such, an arrangement in which antennas are arranged in two planes are obtained. Try to access the network and detect the signal quality of the antennas in two planes. After the scheme of antennas in two planes is adopted, return to the initial connection mode, in which one antenna in each antenna group is enabled. Thereafter, continue the next selection of antennas to avoid call drop of the user terminal equipment due to poor signal quality during selection of antennas.

Figure 7:
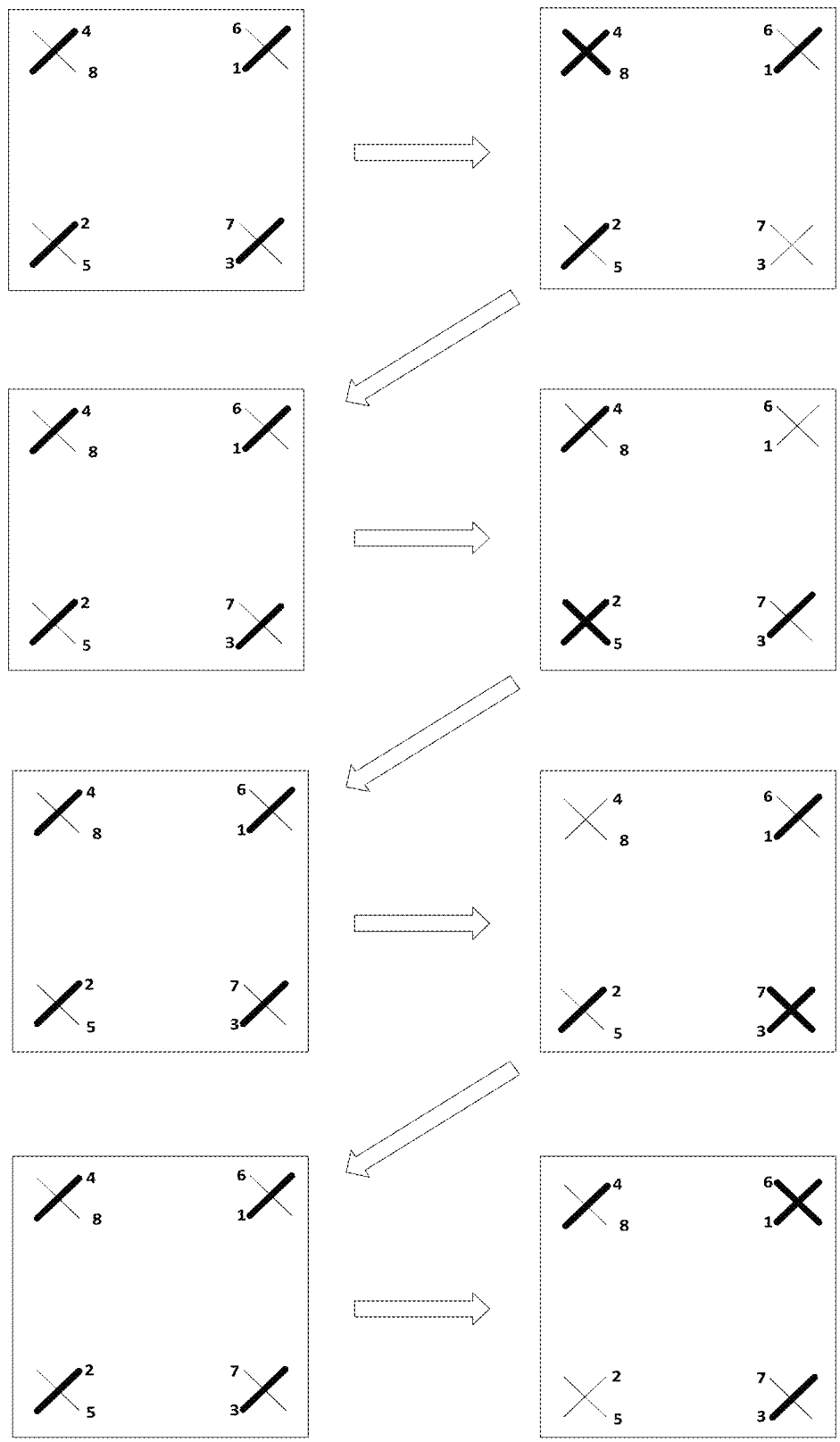
FIG. 7 is a schematic diagram illustrating selection of a set of antennas according to implementations.

FIG. 7 is a schematic diagram illustrating selection of a set of antennas according to implementations. In an example, one antenna in each of the multiple antenna groups can be enabled as illustrated in FIG. 6, for example, a set of antennas of antenna 1, antenna 2, antenna 3, and antenna 4. In this case, any one of antenna 1, antenna 2, antenna 3, and antenna 4 is disabled and a disabled antenna in an antenna group in the middle is enabled. As illustrated in FIG. 7, disable antenna 3 and enable a disabled antenna in an antenna group in the middle among remaining antenna 1, antenna 2, and antenna 4, i.e., enable antenna 8, and record a current signal quality R1 of the antennas, and then return back to the initial connection mode; disable antenna 1 and enable a disabled antenna in an antenna group in the middle among remaining antenna 3, antenna 2, and antenna 4, i.e., enable antenna 5, and record a current signal quality R2 of the antennas, and then return back to the initial connection mode; disable antenna 2 and enable a disabled antenna in an antenna group in the middle among remaining antenna 1, antenna 3, and antenna 4, i.e., enable antenna 6, and record a current signal quality R3 of the antennas, and then return back to the initial connection mode; disable antenna 4 and enable a disabled antenna in an antenna group in the middle among remaining antenna 1, antenna 2, and antenna 3, i.e., enable antenna 7, and record a current signal quality R4 of the antennas.

According to the implementation, the user terminal equipment can disable two antennas in any one antenna group of the multiple antenna groups and enable a disabled antenna in an antenna group in the middle among remaining antenna groups that are not disabled, and further obtain first signal qualities to determine a set of antennas. It is possible to avoid call drop of the user terminal equipment caused by poor signal quality during selection of sets of antennas, and ensure the best signal quality and performance of the set of antennas in the target angular-space.

In an example, a spectrum efficiency algorithm is performed on multiple sets of antennas in angular-space as follows. After the user terminal equipment switches a set of antennas in space of planes (shortened to plane-space) to any one of the multiple sets of antennas in angular-space, receives measurement information corresponding to a current set of antennas in angular-space reported by a modem, where the measurement information is a rank indicator, a signal-to-noise ratio (SINR) value of each rank, a reference signal receiving power, and a modulation order m of the current set of antennas in angular-space in a preset period, and performs the spectrum efficiency algorithm according to the measurement information to determine spectrum efficiency corresponding to the current set of antennas in angular-space. The spectrum efficiency algorithm includes the following. According to a preset mapping relation between channel quality indication (CQI) values and SINR values, determine a $CQI_k$ value of each flow in the SINR value, and according to a preset mapping relation between CQI values and code rates, determine a code rate $R_k$ corresponding to the $CQI_k$ value of each flow; calculate the spectrum efficiency corresponding to the current set of antennas in angular-space according to a preset spectrum efficiency calculation formula, where the preset spectrum efficiency calculation formula may be: $\eta=\Sigma_{n=1}^{Rank}*m*R_k$, and η denotes spectrum efficiency. Herein, the set of antennas in plane-space means that only one antenna in each antenna group is enabled for network access.

According to the implementation, the user terminal equipment can select a set of antennas in angular-space with the optimal signal quality according to measurement information of the multiple sets of antennas in angular-space, such that automatic direction adjustment according to the actual network signal environment can be realized and connection performance of the antennas can be improved.

In at least one implementation, after the set of antennas with the optimal first signal quality is determined according to the multiple first signal qualities to receive or transmit radio frequency signals, the following is further conducted. An enabled antenna adjacent to a first side of the any one antenna group is disabled, a disabled antenna in an antenna group adjacent to a second side of the any one antenna group is enabled, and a current second signal quality is measured and recorded. An enabled antenna adjacent to the second side of the any one antenna group is disabled, a disabled antenna in an antenna group adjacent to the first side of the any one antenna group is enabled, and a current second signal quality is measured and recorded. Optimal two antenna groups are determined according to the current second signal qualities.

The optimal set of antennas is determined according to the initial connection mode. The optimal set of antennas is further determined according to the multiple measured first signal qualities. After the optimal set of antennas is determined, the user terminal equipment obtains multiple (e.g., two) collections of antenna groups according to the optimal set of antennas, where each collection includes two antenna groups, switches to each collection and detects a signal quality, and compares the two signal qualities to determine one collection, that is, two antenna groups, with the optimal signal quality. As such, a better signal quality can be obtained.

In an example, in the optimal set of antennas, one antenna at one of two included angle sides is mutually switched to one antenna at the other of the two included angle sides, and corresponding second signal qualities R1a and R1b are measured. That is, in the optimal set of antennas, one enabled antenna at one of the two included angle sides is disabled and one disabled antenna at the other of the two included angle sides is enabled. For example, disable antenna 4 and enable antenna 7, to obtain two antenna groups and a corresponding second signal quality R1a. Alternatively, disable antenna 3 and enable antenna 8, to obtain two antenna groups and a corresponding second signal quality R1b. Thereafter, compare receiving effects of R1a and R1b, and determine two antenna groups with the optimal effect according to the receiving effects.

The current set of antennas is maintained within a certain period T until a search period of the next automatic adjustment of the set of antennas begins and a better result is obtained, otherwise, the current result remains unchanged.

When the signal quality of the optimal two antenna groups is lower than the signal quality of the optimal set of antennas, the current connection state of the antennas is switch from the optimal two antenna groups to the optimal set of antennas, for connecting the network of the base station.

According to the implementation, the user terminal equipment can determine two antenna groups with the optimal second signal quality according to the optima set of antennas. As such, automatic direction adjustment according to the actual network signal environment can be realized and connection performance of the antennas can be improved.

In at least one implementation, before one antenna adjacent to the first side of the any one antenna group is disabled, and the other antenna in the antenna group adjacent to the second side of the any one antenna group is enabled, the following is conducted. A first signal quality of the optimal set of antennas is detected and recorded. Switch to the other antenna (e.g., a first antenna) from one antenna (e.g., a second antenna) adjacent to the first side of the any one antenna group, where the first antenna and the second antenna are in a same antenna group, and a first signal quality is measured and recorded; and/or switch to the other antenna (e.g., a third antenna) from one antenna (e.g., a fourth antenna) adjacent to the second side of the any one antenna group, where the third antenna and the fourth antenna are in a same antenna group, and a first signal quality is measured and recorded. The first signal qualities are compared to determine a set of antennas with the optimal first signal quality.

It is to be noted that, "switch" herein means switching of states, for example, mutual switching of on/off states (i.e., enabled and disabled) of the antennas. For example, switching to the first antenna from the second antenna means that an on/off state of the second antenna and an on/off state of the first antenna are mutually switched. That is, if the second antenna is disabled and the first antenna is enabled, after switching, the second antenna is enabled and the first antenna is disabled.

According to the implementation, the user terminal equipment can switch the set of antennas according to the multiple first signal qualities when the network is poor, so as to ensure stability of network connection of the antennas of the user terminal equipment.

In at least one example, before one enabled antenna in one of two antenna groups adjacent to the any one antenna group is disabled and one disabled antenna in the other of the two antenna groups is enabled, the following is further conducted. A signal quality of the current optimal set of antennas is detected and recorded. Switch to the other antenna from one antenna in one of the two antenna groups adjacent to the any one antenna group, and a current signal quality is measured and recorded. The signal qualities are compared to determine the set of antennas with the optimal signal quality.

To obtain the optimal antenna selection scheme, before two antenna groups with the optimal signal quality are determined according to the set of antennas in angular-space, polarization selection is further performed on antennas at included angle sides of the set of antennas in angular-space. For example, a set of antennas in angular-space consisting of antenna 1, antenna 6, antenna 4, and antenna 3 is selected as an antenna scheme with optimal signal quality. In a polarization scene, compared with a signal quality of a set of antennas consisting of antenna 1, antenna 6, antenna 8, and antenna 7, the best antenna scheme can be selected.

According to the implementation, the user terminal equipment can perform polarization selection according to the set of antennas in angular-space with the optimal signal quality and determine a set of antennas in angular-space with the optimal signal quality in the polarization scene. In this way, automatic direction adjustment according to the actual network signal environment can be realized and connection performance of the antennas can be improved.

In at least one implementation, enable the two antennas in the any one antenna group of the multiple antenna groups and enable one antenna in each of two antenna groups adjacent to the any one antenna group respectively, and measure the first signal quality of the antennas enabled, to obtain the multiple first signal qualities as follows. A previous set of antennas with the optimal signal quality is enabled. A signal quality of the previous set of antennas with the optimal signal quality is measured. The other antenna in an antenna group to which one enabled antenna at one side in the previous set of antennas with the optimal signal quality belongs is enabled and one antenna in a disabled antenna group adjacent to the antenna group to which one enabled antenna at one side belongs is enabled, and one antenna in an antenna group with two enabled antennas adjacent to the antenna group to which one enabled antenna at one side belongs is disabled and one enabled antenna at the other side in the previous set of antennas with the optimal signal quality is disabled.

Figure 8:
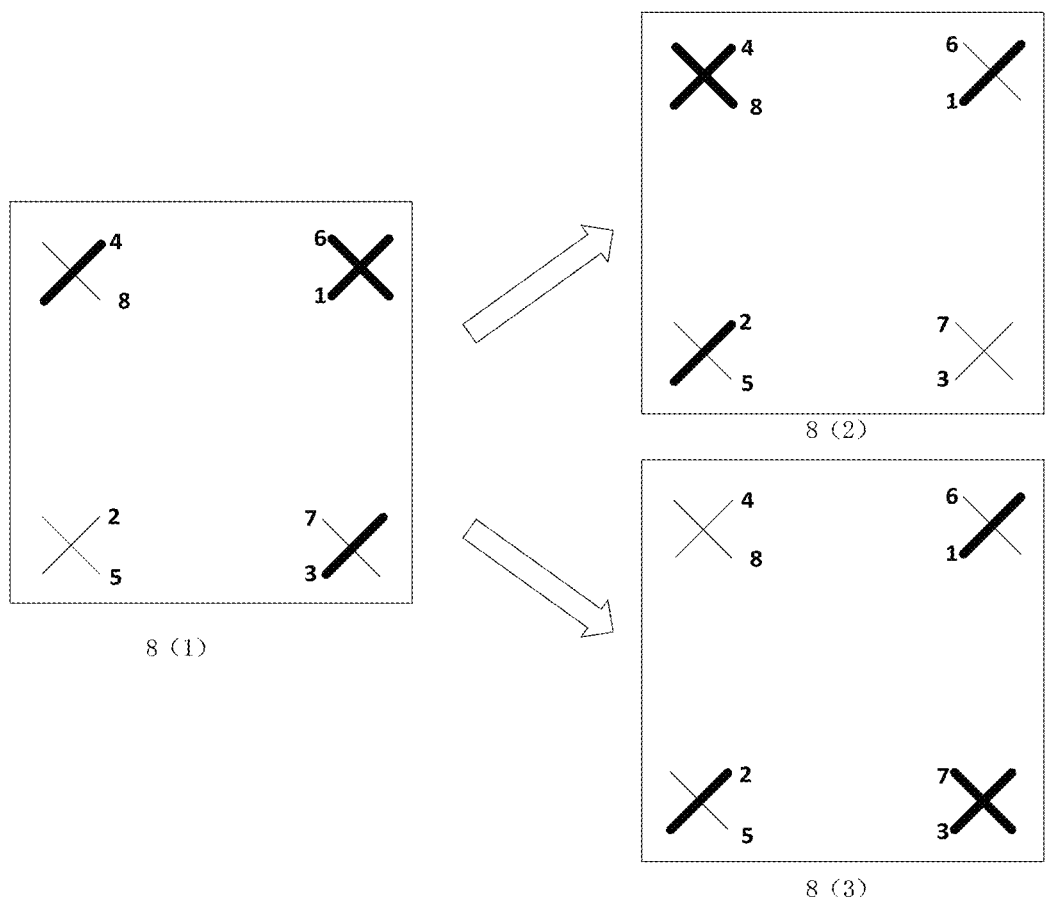
FIG. 8 is a schematic diagram illustrating a set of antennas according to implementations.

FIG. 8 is a schematic diagram illustrating a set of antennas according to implementations. As illustrated in FIG. 8, when a first signal quality of the previous set of antennas with the optimal signal quality is lower than a preset first signal quality, for example, denoted by 8(1) of FIG. 8, an optimal set of antennas denoted by 8(1) is switched to a set of antennas denoted by 8(2) or denoted by 8(3). Furthermore, a first signal quality is measured respectively, to obtain multiple first signal qualities, and the set of antennas with the optimal first signal quality is determined according to the multiple first signal qualities.

According to the implementation, the user terminal equipment can select the previous optimal set of antennas based on previous (or historical) signal qualities to access the network, so as to improve efficiency and a success rate of network connection of the user terminal equipment.

In at least one implementation, after the set of antennas with the optimal first signal quality is determined according to the multiple first signal qualities, to receive or transmit radio frequency signals, a suboptimal set of antennas is enabled according to the multiple first signal qualities when the user terminal equipment is disconnected and then reconnected to a network.

When disconnected from the network, the user terminal equipment enables the set of antennas with suboptimal first signal quality directly according to the multiple measured first signal qualities, for receiving and transmitting radio frequency signals.

According to the implementation, the user terminal equipment can switch the set of antennas according to the multiple first signal qualities when the user terminal equipment is disconnected from the network, so as to ensure stability of network connection of the antennas of the user terminal equipment.

Figure 9:
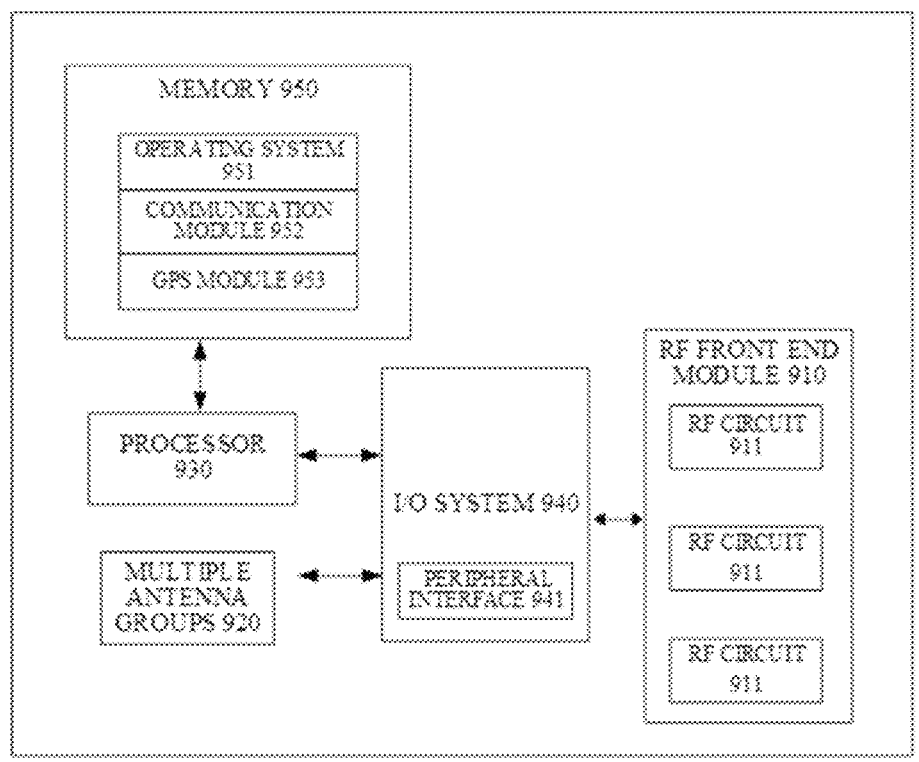
FIG. 9 is a schematic structural diagram illustrating a user terminal equipment according to implementations.

In accordance with the implementation of FIG. 4, FIG. 9 is a schematic structural diagram illustrating a user terminal equipment according to implementations. The user terminal equipment includes a radio frequency (RF) front end module 910, multiple antenna groups 920, at least one processor (such as a processor 930), an input/output (I/O) system 940, and a non-transitory computer readable storage (such as a memory 950). As illustrated in FIG. 9, the user terminal equipment includes the RF front end module 910, the multiple antenna groups 920, and the processor 930.

The RF front end module 910 is configured to control antennas to receive and transmit radio frequency signals. The RF front end module 910 includes multiple RF circuits 911.

The multiple antenna groups 920 are distributed around a periphery of the user terminal equipment, where each antenna group includes two antennas. The multiple antenna groups are electrically coupled with the RF front end module through a peripheral interface 941 of the I/O system 940.

The processor 930 is configured to enable two antennas in any one antenna group of the multiple antenna groups and enable one antenna in each of two antenna groups adjacent to the any one antenna group respectively, and measure a first signal quality of the antennas enabled, to obtain multiple first signal qualities, and determine, according to the multiple first signal qualities, a set of antennas with the optimal first signal quality, to receive and transmit radio frequency signals, when the antennas receive and transmit radio frequency signals.

The memory 950 further includes an operating system 951, a communication module 952, and a global position system (GPS) module 953.

According to the implementations, the user terminal equipment includes the multiple antenna groups distributed around the periphery of the user terminal equipment. Each antenna group includes two antennas. Two antennas in each antenna group are different in polarization direction. The two antennas in the any one antenna group of the multiple antenna groups are enabled and one antenna in each of two antenna groups adjacent to the any one antenna group is enabled respectively, and the first signal quality of the antennas enabled is measured, to obtain the multiple first signal qualities. The set of antennas with the optimal first signal quality is determined according to the multiple first signal qualities, to receive or transmit radio frequency signals. As can be seen, by disposing the multiple antenna groups on the housing of the user terminal equipment and selecting the set of antennas with the optimal first signal quality for network access, it is possible to realize automatic direction adjustment according to an actual signal environment, and improve communication efficiency of antennas and a data transmission rate with the base station.

In at least one implementation, the processor 930 is further configured to: enable one antenna in each of the multiple antenna groups; measure multiple second signal qualities; and start an initial connection mode to receive or transmit radio frequency signals according to the multiple second signal qualities, where the initial connection mode is one antenna in each antenna group corresponding to the optimal second signal quality determined from the multiple second signal qualities.

In at least one implementation, the processor 930 is further configured to: disable two antennas in any one antenna group of the multiple antenna groups, and enable a disabled antenna in an antenna group in the middle among remaining antenna groups that are not disabled.

In at least one implementation, the processor 930 is further configured to: disable two antennas in any one antenna group of the multiple antenna groups and enable a disabled antenna in a target antenna group, in turn in a preset direction; and start the initial connection mode after enabling the disabled antenna in the target antenna group and measure a current signal quality.

In at least one implementation, the processor 930 is further configured to: disable an enabled antenna adjacent to a first side of the any one antenna group, enable a disabled antenna in an antenna group adjacent to a second side of the any one antenna group, and measure and record a current second signal quality; disable an enabled antenna adjacent to the second side of the any one antenna group, enable a disabled antenna in an antenna group adjacent to the first side of the any one antenna group, and measure and record a current second signal quality; and determine optimal two antenna groups according to the current second signal qualities.

In at least one implementation, the processor 930 is further configured to: detect and record a first signal quality of the optimal set of antennas; switch to the other antenna from one antenna adjacent to the first side of the any one antenna group, and measure and record a first signal quality; and/or switch to the other antenna from one antenna adjacent to the second side of the any one antenna group, and measure and record a first signal quality; and compare the first signal qualities to determine a set of antennas with the optimal first signal quality.

In at least one implementation, the processor 930 is further configured to: enable a previous set of antennas with the optimal signal quality; measure a signal quality of the previous set of antennas with the optimal signal quality; and enable the other antenna in an antenna group to which one enabled antenna at one side in the previous set of antennas with the optimal signal quality belongs and enable one antenna in a disabled antenna group adjacent to the antenna group to which one enabled antenna at one side belongs, and disable one antenna in an antenna group with two enabled antennas adjacent to the antenna group to which one enabled antenna at one side belongs and disable one enabled antenna at the other side in the previous set of antennas with the optimal signal quality.

In at least one implementation, the processor 930 is further configured to: enable a suboptimal set of antennas according to the multiple first signal qualities when the user terminal equipment is disconnected and then reconnected to a network.

Figure 10:
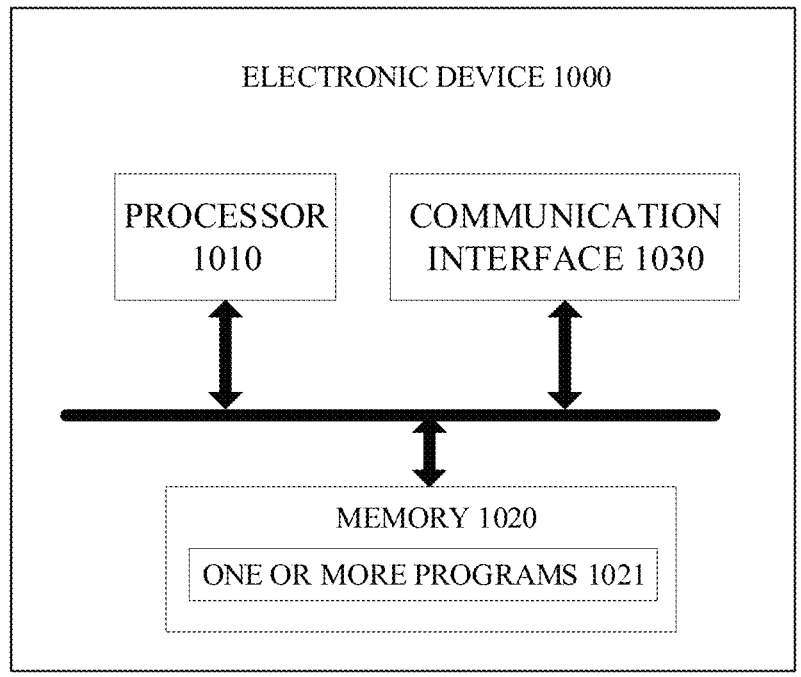
FIG. 10 is a schematic structural diagram illustrating an electronic device according to implementations.

In accordance with the implementation of FIG. 4, FIG. 10 is a schematic structural diagram illustrating an electronic device 1000 according to implementations. As illustrated in FIG. 10, the electronic device 1000 includes at least one processor (such as a processor 1010), a communication interface 1030, a non-transitory computer readable storage (such as a memory 1020) coupled to the at least one processor 1010 and the communication interface 1030 and configured to store at least one computer executable instruction (such as one or more programs 1021). The one or more programs 1021 are configured to be executed by the processor 1010 and include instructions configured to execute the following.

Two antennas in any one antenna group of the multiple antenna groups are enabled and one antenna in each of two antenna groups adjacent to the any one antenna group is enabled respectively, and a first signal quality of the antennas enabled is measured, to obtain multiple first signal qualities. A set of antennas with the optimal first signal quality is determined according to the multiple first signal qualities, to receive or transmit radio frequency signals.

According to the implementations, the electronic device includes the multiple antenna groups distributed around the periphery of the electronic device. Each antenna group includes two antennas. Two antennas in each antenna group are different in polarization direction. The two antennas in the any one antenna group of the multiple antenna groups are enabled and one antenna in each of two antenna groups adjacent to the any one antenna group is enabled respectively, and the first signal quality of the antennas enabled is measured, to obtain the multiple first signal qualities. The set of antennas with the optimal first signal quality is determined according to the multiple first signal qualities, to receive or transmit radio frequency signals. As can be seen, by disposing the multiple antenna groups on the housing of the electronic device and selecting the set of antennas with the optimal first signal quality for network access, it is possible to realize automatic direction adjustment according to an actual signal environment, and improve communication efficiency of antennas and a data transmission rate with the base station.

In at least one implementation, the one or more programs further include instructions configured to perform the following before the two antennas in the any one antenna group of the multiple antenna groups are enabled and one antenna in each of two antenna groups adjacent to the any one antenna group is enabled respectively and the first signal quality of the antennas enabled is measured. One antenna in each of the multiple antenna groups is enabled. Multiple second signal qualities are measured. An initial connection mode is started to receive or transmit radio frequency signals according to the multiple second signal qualities, where the initial connection mode is one antenna in each antenna group corresponding to the optimal second signal quality determined from the multiple second signal qualities.

In at least one implementation, in terms of enabling the two antennas in the any one antenna group of the multiple antenna groups and enabling one antenna in each of two antenna groups adjacent to the any one antenna group respectively, the instructions of the one or more programs are configured to perform the following. Two antennas in any one antenna group of the multiple antenna groups are disabled, and a disabled antenna in an antenna group in the middle among remaining antenna groups that are not disabled is enabled.

In at least one implementation, in terms of disabling two antennas in any one antenna group of the multiple antenna groups, and enabling the disabled antenna in the antenna group in the middle among the remaining antenna groups that are not disabled, the instructions of the one or more programs are configured to perform the following. Two antennas in any one antenna group of the multiple antenna groups are disabled and a disabled antenna in a target antenna group is enabled, sequentially along a preset direction. The initial connection mode is started, after the disabled antenna in the target antenna group is enabled and a current signal quality is measured.

In at least one implementation, the one or more programs further include instructions configured to perform the following after the set of antennas with the optimal first signal quality is determined according to the multiple first signal qualities to receive or transmit radio frequency signals. An enabled antenna adjacent to a first side of the any one antenna group is disabled, a disabled antenna in an antenna group adjacent to a second side of the any one antenna group is enabled, and a current second signal quality is measured and recorded. An enabled antenna adjacent to the second side of the any one antenna group is disabled, a disabled antenna in an antenna group adjacent to the first side of the any one antenna group is enabled, and a current second signal quality is measured and recorded. Optimal two antenna groups are determined according to the current second signal qualities.

In at least one implementation, the one or more programs further include instructions configured to perform the following before one antenna adjacent to the first side of the any one antenna group is disabled, and the other antenna in the antenna group adjacent to the second side of the any one antenna group is enabled. A first signal quality of the optimal set of antennas is detected and recorded. Switch to the other antenna from one antenna adjacent to the first side of the any one antenna group, and a first signal quality is measured and recorded; and/or switch to the other antenna from one antenna adjacent to the second side of the any one antenna group, and a first signal quality is measured and recorded. The first signal qualities are compared to determine a set of antennas with the optimal first signal quality.

In at least one implementation, in terms of enabling the two antennas in the any one antenna group of the multiple antenna groups and enabling one antenna in each of two antenna groups adjacent to the any one antenna group respectively, and measuring the first signal quality of the antennas enabled, to obtain the multiple first signal qualities, the instructions of the one or more programs are configured to perform the following. A previous set of antennas with the optimal signal quality is enabled. A signal quality of the previous set of antennas with the optimal signal quality is measured. The other antenna in an antenna group to which one enabled antenna at one side in the previous set of antennas with the optimal signal quality belongs is enabled and one antenna in a disabled antenna group adjacent to the antenna group to which one enabled antenna at one side belongs is enabled, and one antenna in an antenna group with two enabled antennas adjacent to the antenna group to which one enabled antenna at one side belongs is disabled and one enabled antenna at the other side in the previous set of antennas with the optimal signal quality is disabled.

In at least one implementation, the one or more programs further include instructions configured to enable a suboptimal set of antennas according to the multiple first signal qualities when the electronic device is disconnected and then reconnected to a network, after the set of antennas with the optimal first signal quality is determined according to the multiple first signal qualities, to receive or transmit radio frequency signals.

The foregoing solution of the implementations of the disclosure is mainly described from the viewpoint of execution process of the method. It can be understood that, in order to implement the above functions, the electronic device or the user terminal equipment includes hardware structures and/or software modules corresponding to the respective functions. Those skilled in the art should readily recognize that, in combination with the example units and scheme steps described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the user device equipment in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations of the present disclosure is schematic, and is merely a logical function division, and there may be other division manners in actual implementation.

Figure 11:
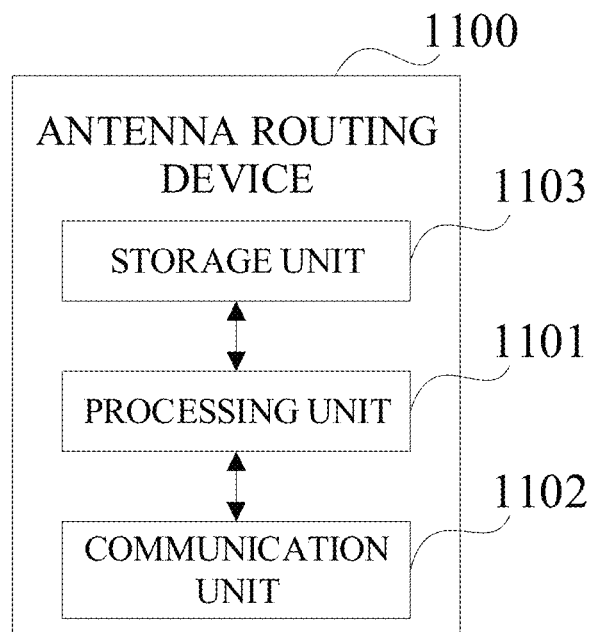
FIG. 11 is a block diagram of functional units of an antenna routing device according to implementations.

FIG. 11 is a block diagram of functional units of an antenna routing device 1100 according to implementations. The antenna routing device 1100 is applicable to a user terminal equipment. The user terminal equipment includes multiple antenna groups distributed around a periphery of the user terminal equipment. Each antenna group includes two antennas. Two antennas in each antenna group are different in polarization direction. The device includes a processing unit 1101 and a communication unit 1102.

The processing unit 1101 is configured to enable two antennas in any one antenna group of the multiple antenna groups and enable one antenna in each of two antenna groups adjacent to the any one antenna group respectively, measure a signal quality of the antennas enabled, repeat the above for at least two of the multiple antenna groups to obtain multiple signal qualities, and determine a set of antennas with the optimal signal quality according to the multiple signal qualities.

The antenna routing device 1100 may further include a storage unit 1103 for storing program codes and data of the user terminal equipment. The processing unit 1101 may be a processor, the communication unit 1102 may be a touch display screen or a transceiver, and the storage unit 1103 may be a memory.

According to the implementations, the user terminal equipment includes the multiple antenna groups distributed around the periphery of the user terminal equipment. Each antenna group includes two antennas. Two antennas in each antenna group are different in polarization direction. The two antennas in the any one antenna group of the multiple antenna groups are enabled and one antenna in each of two antenna groups adjacent to the any one antenna group is enabled respectively, and the first signal quality of the antennas enabled is measured, to obtain the multiple first signal qualities. The set of antennas with the optimal first signal quality is determined according to the multiple first signal qualities, to receive or transmit radio frequency signals. As can be seen, by disposing the multiple antenna groups on the housing of the user terminal equipment and selecting the set of antennas with the optimal first signal quality for network access, it is possible to realize automatic direction adjustment according to an actual signal environment, and improve communication efficiency of antennas and a data transmission rate with the base station.

In at least one implementation, the processing unit 1101 is further configured to: enable one antenna in each of the multiple antenna groups; measure multiple second signal qualities; and start an initial connection mode to receive or transmit radio frequency signals according to the multiple second signal qualities, where the initial connection mode is one antenna in each antenna group corresponding to the optimal second signal quality determined from the multiple second signal qualities, before the two antennas in the any one antenna group of the multiple antenna groups are enabled and one antenna in each of two antenna groups adjacent to the any one antenna group is enabled respectively and the first signal quality of the antennas enabled is measured.

In at least one implementation, in terms of enabling the two antennas in the any one antenna group of the multiple antenna groups and enabling one antenna in each of two antenna groups adjacent to the any one antenna group respectively, the processing unit 1101 is configured to: disable two antennas in any one antenna group of the multiple antenna groups, and enable a disabled antenna in an antenna group in the middle among remaining antenna groups that are not disabled.

In at least one implementation, in terms of disabling two antennas in any one antenna group of the multiple antenna groups, and enabling the disabled antenna in the antenna group in the middle among the remaining antenna groups that are not disabled, the processing unit 1101 is configured to: sequentially disable two antennas in any one antenna group of the multiple antenna groups and enable a disabled antenna in a target antenna group, along a preset direction; and start the initial connection mode after enabling the disabled antenna in the target antenna group and measure a current signal quality.

In at least one implementation, the processing unit 1101 is further configured to: disable one antenna adjacent to a first side of the any one antenna group, enable the other antenna in an antenna group adjacent to a second side of the any one antenna group, and measure and record a current second signal quality; disable one antenna adjacent to the second side of the any one antenna group, enable the other antenna in an antenna group adjacent to the first side of the any one antenna group, and measure and record a current second signal quality; and determine optimal two antenna groups according to the current second signal qualities, after the set of antennas with the optimal first signal quality is determined according to the multiple first signal qualities to receive or transmit radio frequency signals.

In at least one implementation, the processing unit 1101 is further configured to: detect and record a first signal quality of the optimal set of antennas; switch to the other antenna from one antenna adjacent to the first side of the any one antenna group, and measure and record a first signal quality; and/or switch to the other antenna from one antenna adjacent to the second side of the any one antenna group, and measure and record a first signal quality; and compare the first signal qualities to determine a set of antennas with the optimal first signal quality, before one antenna adjacent to the first side of the any one antenna group is disabled, and the other antenna in the antenna group adjacent to the second side of the any one antenna group is enabled.

In at least one implementation, in terms of enabling the two antennas in the any one antenna group of the multiple antenna groups and enabling one antenna in each of two antenna groups adjacent to the any one antenna group respectively, and measuring the first signal quality of the antennas enabled, to obtain the multiple first signal qualities, the processing unit 1101 is configured to: enable a previous set of antennas with the optimal signal quality; measure a signal quality of the previous set of antennas with the optimal signal quality; and enable the other antenna in an antenna group to which one enabled antenna at one side in the previous set of antennas with the optimal signal quality belongs and enable one antenna in a disabled antenna group adjacent to the antenna group to which one enabled antenna at one side belongs, and disable one antenna in an antenna group with two enabled antennas adjacent to the antenna group to which one enabled antenna at one side belongs and disable one enabled antenna at the other side in the previous set of antennas with the optimal signal quality.

In at least one implementation, the processing unit 1101 is further configured to: enable a suboptimal set of antennas according to the multiple signal qualities when the user terminal equipment is disconnected and then reconnected to a network, after the set of antennas with the optimal signal quality is determined according to the multiple signal qualities, to receive or transmit radio frequency signals.

It can be understood that, the method implementations and the device implementations are different presentation forms of the same technical concept, and thus in this application, contents of the method implementations should be adapted to the device implementations, which is not repeated herein.

Implementations of the present disclosure further provide a computer storage medium. The computer storage medium may store computer programs for electronic data interchange. When executed, the computer programs cause a computer to accomplish all or part of the operations of any of method described in the above method implementations. The computer includes a user terminal equipment.

Implementations of the present disclosure further provide a computer program product. The computer program product includes a non-transitory computer readable storage medium storing computer programs. The computer programs are operable with a computer to accomplish all or part of the operations of any of the methods described in the above method implementations. The computer program product may be a software installation package. The computer includes a user terminal equipment.

It is to be noted that, for the sake of simplicity, the foregoing method implementations are described as a series of action combinations, however, it will be appreciated by those skilled in the art that the present disclosure is not limited by the sequence of actions described. That is because that, according to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the device disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection via some interfaces, or may be indirect coupling or communication among devices or units, and may be electrical connection, or other forms of connection.

The units described as separate components may or may not be physically separate, the components illustrated as units may or may not be physical units, that is, they may be in the same place or may be distributed to multiple network elements. Part or all of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the operations described in the various implementations of the present disclosure. The memory includes various medium capable of storing program codes, such as a universal serial bus (USB), a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer readable memory, which may include a flash memory, a ROM, a RAM, Disk or CD, and so on.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An antenna routing method, applicable to a user terminal equipment, the user terminal equipment comprising a plurality of antenna groups distributed around a periphery of the user terminal equipment, each antenna group comprising two antennas, and two antennas in each antenna group being different in polarization direction, the method comprising:
    enabling two antennas in any one antenna group of the plurality of antenna groups and enabling one antenna in each of two antenna groups adjacent to the any one antenna group respectively, and measuring a first signal quality of the antennas enabled, to obtain a plurality of first signal qualities; and
    determining, according to the plurality of first signal qualities, a set of antennas with an optimal first signal quality, to receive or transmit radio frequency signals.

2. The method of claim 1, further comprising:
    before enabling the two antennas in the any one antenna group of the plurality of antenna groups and enabling one antenna in each of two antenna groups adjacent to the any one antenna group respectively, and measuring the first signal quality of the antennas enabled,
    enabling one antenna in each of the plurality of antenna groups;
    measuring a plurality of second signal qualities; and
    starting an initial connection mode to receive or transmit radio frequency signals according to the plurality of second signal qualities, wherein in the initial connection mode is one antenna in each antenna group corresponding to an optimal second signal quality determined from the plurality of second signal qualities.

3. The method of claim 2, wherein enabling the two antennas in the any one antenna group of the plurality of antenna groups and enabling one antenna in each of two antenna groups adjacent to the any one antenna group respectively comprises:
    disabling two antennas in any one antenna group of the plurality of antenna groups, and enabling a disabled antenna in an antenna group in the middle among remaining antenna groups that are not disabled.

4. The method of claim 3, wherein disabling two antennas in any one antenna group of the plurality of antenna groups, and enabling the disabled antenna in the antenna group in the middle among the remaining antenna groups that are not disabled comprises:
    disabling two antennas in any one antenna group of the plurality of antenna groups and enabling a disabled antenna in a target antenna group, in turn in a preset direction, wherein the target antenna group is an antenna group in the middle among remaining antenna groups that are not disabled; and starting the initial connection mode, after enabling the disabled antenna in the target antenna group and measuring a current signal quality.

5. The method of claim 1, further comprising:

after determining, according to the plurality of first signal qualities, the set of antennas with the optimal first signal quality, to receive or transmit radio frequency signals, disabling an enabled antenna adjacent to a first side of the any one antenna group, enabling a disabled antenna in an antenna group adjacent to a second side of the any one antenna group, and measuring and recording a current second signal quality;

disabling an enabled antenna adjacent to the second side of the any one antenna group, enabling a disabled antenna in an antenna group adjacent to the first side of the any one antenna group, and measuring and recording a current second signal quality; and determining optimal two antenna groups according to the current second signal qualities.

6. The method of claim 5, further comprising:

before disabling one antenna adjacent to the first side of the any one antenna group, and enabling the other antenna in the antenna group adjacent to the second side of the any one antenna group, detecting and recording a first signal quality of the optimal set of antennas;

switching to the other antenna from one antenna adjacent to the first side of the any one antenna group, and measuring and recording a first signal quality; and/or switching to the other antenna from one antenna adjacent to the second side of the any one antenna group, and measuring and recording a first signal quality; and comparing the first signal qualities to determine a set of antennas with the optimal first signal quality.

7. The method of claim 1, wherein enabling the two antennas in the any one antenna group of the plurality of antenna groups and enabling one antenna in each of two antenna groups adjacent to the any one antenna group respectively comprises:

enabling a previous set of antennas with the optimal signal quality;

measuring a signal quality of the previous set of antennas with the optimal signal quality; and enabling the other antenna in an antenna group to which one enabled antenna at one side in the previous set of antennas with the optimal signal quality belongs and enabling one antenna in a disabled antenna group adjacent to the antenna group to which one enabled antenna at one side belongs, and disabling one antenna in an antenna group with two enabled antennas adjacent to the antenna group to which one enabled antenna at one side belongs and disabling one enabled antenna at the other side in the previous set of antennas with the optimal signal quality.

8. The method of claim 1, further comprising:

after determining, according to the plurality of first signal qualities, the set of antennas with the optimal first signal quality, to receive or transmit radio frequency signals, enabling a suboptimal set of antennas according to the plurality of first signal qualities when the user terminal equipment is disconnected and then reconnected to a network.

9. A user terminal equipment, comprising:

a radio frequency front end module configured to control antennas to receive and transmit radio frequency signals;

a plurality of antenna groups distributed around a periphery of the user terminal equipment, wherein each antenna group comprises two antennas;

at least one processor; and a non-transitory computer readable storage coupled to the at least one processor and storing at least one computer executable instruction thereon which, when executed by the at least one processor, causes the at least one processor to:

enable two antennas in any one antenna group of the plurality of antenna groups and enable one antenna in each of two antenna groups adjacent to the any one antenna group respectively, measure a signal quality of the antennas enabled, repeat the above for at least two of the plurality of antenna groups to obtain a plurality of signal qualities, and determine a set of antennas with an optimal signal quality according to the plurality of signal qualities to receive or transmit radio frequency signals, when the antennas receive and transmit radio frequency signals.

10. The user terminal equipment of claim 9, wherein the at least one processor is further configured to:

enable one antenna in each of the plurality of antenna groups;

measure a plurality of second signal qualities; and start an initial connection mode to receive or transmit radio frequency signals according to the plurality of second signal qualities, wherein the initial connection mode is one antenna in each antenna group corresponding to an optimal second signal quality determined from the plurality of second signal qualities.

11. The user terminal equipment of claim 10, wherein the at least one processor configured to enable the two antennas in the any one antenna group of the plurality of antenna groups and enable one antenna in each of two antenna groups adjacent to the any one antenna group respectively is configured to:

disable two antennas in any one antenna group of the plurality of antenna groups, and enable a disabled antenna in an antenna group in the middle among remaining antenna groups that are not disabled.

12. The user terminal equipment of claim 11, wherein the at least one processor configured to disable two antennas in any one antenna group of the plurality of antenna groups, and enable the disabled antenna in the antenna group in the middle among the remaining antenna groups that are not disabled is configured to:

disable two antennas in any one antenna group of the plurality of antenna groups and enable a disabled antenna in a target antenna group, in turn in a preset direction, wherein the target antenna group is an antenna group in the middle among remaining antenna groups that are not disabled; and start the initial connection mode after enabling the disabled antenna in the target antenna group and measure a current signal quality.

13. The user terminal equipment of claim 9, wherein the at least one processor is further configured to:

disable an enabled antenna adjacent to a first side of the any one antenna group, enable a disabled antenna in an antenna group adjacent to a second side of the any one antenna group, and measure and record a current second signal quality;

disable an enabled antenna adjacent to the second side of the any one antenna group, enable a disabled antenna in an antenna group adjacent to the first side of the any one antenna group, and measure and record a current second signal quality; and determine optimal two antenna groups according to the current second signal qualities.

14. The user terminal equipment of claim 13, wherein the at least one processor is further configured to:

detect and record a first signal quality of the optimal set of antennas;

switch to the other antenna from one antenna adjacent to the first side of the any one antenna group, and measure and record a first signal quality; and/or switch to the other antenna from one antenna adjacent to the second side of the any one antenna group, and measure and record a first signal quality; and compare the first signal qualities to determine a set of antennas with the optimal first signal quality.

15. The user terminal equipment of claim 9, wherein the at least one processor configured to enable the two antennas in the any one antenna group of the plurality of antenna groups and enable one antenna in each of two antenna groups adjacent to the any one antenna group respectively is configured to:

enable a previous set of antennas with the optimal signal quality;

measure a signal quality of the previous set of antennas with the optimal signal quality; and enable the other antenna in an antenna group to which one enabled antenna at one side in the previous set of antennas with the optimal signal quality belongs and enable one antenna in a disabled antenna group adjacent to the antenna group to which one enabled antenna at one side belongs, and disable one antenna in an antenna group with two enabled antennas adjacent to the antenna group to which one enabled antenna at one side belongs and disable one enabled antenna at the other side in the previous set of antennas with the optimal signal quality.

16. The user terminal equipment of claim 9, wherein the at least one processor is further configured to:

enable a suboptimal set of antennas according to the plurality of signal qualities when the user terminal equipment is disconnected and then reconnected to a network.

17. An electronic device, comprising:
at least one processor;
a communication interface; and
a non-transitory computer readable storage coupled to the at least one processor and storing at least one computer executable instruction thereon which, when executed by the at least one processor, causes the at least one processor to:

enable two antennas in any one antenna group of a plurality of antenna groups of the electronic device and enable one antenna in each of two antenna groups adjacent to the any one antenna group respectively, and measure a first signal quality of the antennas enabled, to obtain a plurality of first signal qualities, wherein the plurality of antenna groups are distributed around a periphery of the electronic device, each antenna group comprises two antennas, and two antennas in each antenna group are different in polarization direction; and determine, according to the plurality of first signal qualities, a set of antennas with an optimal first signal quality, to receive or transmit radio frequency signals.

18. The electronic device of claim 17, wherein the at least one processor is further configured to:

enable one antenna in each of the plurality of antenna groups;

measure a plurality of second signal qualities; and start an initial connection mode to receive or transmit radio frequency signals according to the plurality of second signal qualities, wherein the initial connection mode is one antenna in each antenna group corresponding to an optimal second signal quality determined from the plurality of second signal qualities.

19. The electronic device of claim 18, wherein the at least one processor configured to enable the two antennas in the any one antenna group of the plurality of antenna groups and enable one antenna in each of two antenna groups adjacent to the any one antenna group respectively is configured to:

disable two antennas in any one antenna group of the plurality of antenna groups, and enable a disabled antenna in an antenna group in the middle among remaining antenna groups that are not disabled.

20. The electronic device of claim 19, wherein the at least one processor configured to disable two antennas in any one antenna group of the plurality of antenna groups, and enable the disabled antenna in the antenna group in the middle among the remaining antenna groups that are not disabled is configured to:

disable two antennas in any one antenna group of the plurality of antenna groups and enable a disabled antenna in a target antenna group, in turn in a preset direction, wherein the target antenna group is an antenna group in the middle among remaining antenna groups that are not disabled; and start the initial connection mode after enabling the disabled antenna in the target antenna group and measure a current signal quality.

* * * * *